United States Patent
Xie et al.

(10) Patent No.: US 6,210,562 B1
(45) Date of Patent: Apr. 3, 2001

(54) PROCESS FOR PRODUCTION OF ETHYLENE AND PROPYLENE BY CATALYTIC PYROLYSIS OF HEAVY HYDROCARBONS

(75) Inventors: Chaogang Xie; Zaiting Li; Wenyuan Shi; Xieqing Wang, all of Beijing (CN)

(73) Assignees: China Petrochemical Corporation; Research Institute of Petroleum Processing, SINOPEC, both of Beijing (CN)

( * ) Notice: Subject to any disclaimer, the term of this patent is extended or adjusted under 35 U.S.C. 154(b) by 0 days.

(21) Appl. No.: 09/172,651

(22) Filed: Oct. 15, 1998

(30) Foreign Application Priority Data

Oct. 15, 1997  (CN) .................................................. 97119011

(51) Int. Cl.[7] ..................................................... C10G 11/02
(52) U.S. Cl. .......................... 208/118; 208/114; 208/113; 208/120.01; 208/120.05; 585/648; 585/650; 585/651; 585/652; 585/653
(58) Field of Search ..................................... 585/648, 650, 585/651, 652, 653; 208/118, 114, 120.01, 120.25

(56) References Cited

U.S. PATENT DOCUMENTS

| 4,757,040 | * | 7/1988 | Guan | ........................................ 502/63 |
| 4,980,053 | * | 12/1990 | Li | ........................................ 208/120 |
| 5,232,675 | * | 8/1993 | Shu | ........................................ 423/328 |
| 5,523,502 | * | 6/1996 | Rubin | ........................................ 585/648 |
| 5,670,037 | * | 9/1997 | Zaiting et al. | ........................................ 208/111 |

FOREIGN PATENT DOCUMENTS

| 1069016 | 7/1992 | (CN) . |
| 1083092 | 3/1994 | (CN) . |
| 6-0222428 | 8/1994 | (JP) . |

* cited by examiner

*Primary Examiner*—Helane E. Myers
(74) *Attorney, Agent, or Firm*—Birch, Stewart, Kolasch & Birch, LLP

(57) ABSTRACT

A catalytic pyrolysis process for production of ethylene and propylene from heavy hydrocarbons, comprises that heavy hydrocarbons are contacted with a pillared interlayered clay molecular sieve and/or phosphorus and aluminum or magnesium or calcium modified high silica zeolite having a structure of pentasil contained catalysts in a riser or downflow transfer line reactor in the presence of steam and catalytically pyrolysed at a temperature of 650° C. to 750° C. and a pressure of 0.15 to 0.4 MPa for a contact time of 0.2 to 5 seconds, a weight ratio of catalyst to feedstock of 15:1 to 40:1 and a weight ratio of steam to feedstock of 0.3:1 to 1:1. The yields of ethylene and propylene by the present invention are over 18 wt %.

14 Claims, No Drawings

PROCESS FOR PRODUCTION OF ETHYLENE AND PROPYLENE BY CATALYTIC PYROLYSIS OF HEAVY HYDROCARBONS

FIELD OF THE INVENTION

The present invention relates to a catalytic pyrolysis process of heavy hydrocarbons, and mole particularly to a process for producing light olefins, especially ethylene and propylene, by catalytic pyrolysis of heavy hydrocarbons using catalyst in the presence of steam.

DESCRIPTION OF THE PRIOR ART

The conventional ethylene production technology is the known tubular furnace steam cracking, which requires light hydrocarbons as feedstock, such as ethane, propane, butane, natural gas, naphtha or light gas oil.

As crude oils are becoming heavier, and the supply of light hydrocarbons is limited, great attention has been paid to developing new technologies for directly converting heavy hydrocarbons into ethylene. For example, heavy hydrocarbon thermal cracking using coke particles or quartz as a heat carrier, heavy hydrocarbon thermo-catalytic cracking using alkaline metal oxides or alkaline-earth metal oxides as catalyst, etc. These methods all need reaction temperatures higher than 800° C.

Recently, some methods using solid acidic catalysts in certain types of reactors under certain operating conditions for converting heavy hydrocarbons to light olefins have been introduced and reported in various patents. For example, DD 152,356A discloses a method for producing light olefins using amorphous aluminosilicate catalyst and a fixed or moving bed reactor, when using VGO as feedstock, 13.5 wt % ethylene and 6.3 wt % propylene are obtained under a reaction temperature of 700° C. and a steam to feedstock weight ratio of 4.7. JP 60-222,428 discloses a process using ZSM-5 zeolite as active component of the catalyst and $C_5$~$C_{25}$ paraffin hydrocarbons as feedstock, the total yield of ethylene, propylene and butene reaches about 30 wt % at a temperature of 600° C. to 750° C. and a weight hourly space velocity of 20 to 300 $h^{-1}$. U.S. Pat. No. 4,980,053 discloses a process for production of propylene and butene in a fluidized or moving bed reactor using solid acidic catalyst at a temperature of 500° C. to 650° C., with a weight hourly space velocity of 0.2 to 20 $h^{-1}$ and the catalyst to feedstock weight ratio of 2:1 to 12:1, 5.9 wt % ethylene, 21.9 wt % propylene and 15.6 wt % butylene are obtained at a reaction temperature of 580° C. using VGO as feedstock and a catalyst with ZSM-5 zeolite as active component and kaolin as matrix. CN1069016A discloses a process for the production of $C_2^=$ as well as $C_3^=$ and $C_4^=$ by converting heavy hydrocarbons in a fluidized bed or piston flow reactor under the main reaction conditions: at a temperature of 650~900 ° C., a pressure of 0.13~0.28 MPa, a catalyst/oil ratio of 5~35, a contact time of 0.1~3 sec., the yield of $C_2^=$ reaches 17–27 wt %, with the total yield of $C_2^=$~$C_4^=$ up to 30~40 wt %.

In CN1083092A, molecular sieve catalyst containing a pillared interlayered clay and/or a high silica zeolite catalyst containing rare earth are/is used for cracking heavy hydrocarbons under the conditions of at 680~780° C., 1.5~4.0× Mpa, a reaction time of 0.1~3.0 sec., with a water/oil ratio of 0.2~2.0, and a catalyst/oil ratio of 5~40, a yield of 23 wt % $C_2^=$ is obtained, with the yield of $C_2^=$~$C_4^=$ being 50 wt %.

OBJECTS OF THE INVENTION

The object of the present invention is to provide a novel process for producing light olefins, especially ethylene and propylene, from heavy hydrocarbons in a riser or downfow transfer line reactor. Other objects of the present invention can be learned from the content of the specification of the present invention including the clam.

The object of the present invention is achieved by the technical solution described below.

SUMMARY OF THE INVENTION

In the process of the present invention, heavy hydrocarbons are contacted with hot pillared interlayered clay molecular sieve and/or phosphorus and aluminum or magnesium or calcium modified high silica zeolite having a structure of pentasil containing catalysts in a riser or downflow transfer line reactor and catalytically pyrolysed under given operating conditions. The reaction effluent, steam and spent catalyst are separated by a rapid gas-solid separation system, the reaction effluent is separated to obtain ethylene and propylene containing gaseous products and liquid products, and the spent catalyst is further removed to a stripper. After stripped by steam, the spent catalyst is removed to a regenerator where it is contacted with an oxygen containing gas and is regenerated, the hot regenerated catalyst is stripped and then recycled to the reactor for reuse.

DETAILED DESCRIPTION OF THE INVENTION

The process provided by the present invention comprises the following steps: the preheated heavy hydrocarbons are contacted with hot pillared interlayered clay molecular sieve and/or phosphorus and aluminum or magnesium or calcium modified high silica zeolite having a structure of pentasil containing catalysts in a riser or downflow transfer line reactor and catalytically pyrolysed at a temperature of 650° C. to 750° C. and a pressure of 0.15 to 0.4 MPa, for a contact time of 0.2 to 5 seconds, a weight ratio of catalyst to feedstock of 15:1 to 40:1 and, a weight ratio of steam to feedstock of 0.3:1 to 1:1. The reaction effluent, steam and spent catalyst are separated by rapid gas-solid separation system, the reaction effluent removed from the reactor is quenched by light hydrocarbons and further separated to obtain ethylene and propylene containing gaseous products and liquid products, and the spent catalyst is further removed to the stripper. After stripped by steam, hydrocarbon products adsorbed on the catalyst are stripped out. The spent catalyst with coke deposited thereon is then removed to a regenerator, in which the regeneration is carried out by contacting the catalyst with hot oxygen-containing gas, such as air for coke burning-off. The regenerated catalyst is stripped by steam and/or other inert gases, to desorb the carried non-hydrocarbon impurities, and then recycled to the reactor for reuse. The hot regenerated catalyst provides the reaction heat for catalytic pyrolysis of heavy hydrocarbons, whereas the heat released by the spent catalyst under regeneration in the regenerator is absorbed by the regenerated catalyst which, when recycling back to the reactor, provides the heavy hydrocarbon feedstocks with the absorbed heat for carrying on the catalytic pyrolysis reaction.

The catalyst used in the process of the present invention comprises 1~70% by weight of clay, 5~85% by weight of inorganic oxides and 10~70% by weight of active component, wherein said clay is selected from kaolin and/or kaolin polyhydrate, said inorganic oxide is selected from amorphous aluminosilicate, silica or alumina, said active component is selected from pillared interlayered clay molecular sieve and/or phosphorus and aluminum or magnesium or calcium modified high silica zeolite having a structure of pentasil.

One of the active components used in the present invention is pillared interlayered clay molecular sieve, which is aluminum pillared natural or synthetic clay material with regularly interstratified or monostratified mineral clay structure using aluminum containing chemical component as pillaring agent, a quite good one among them is aluminum pillared interlayered rectorite or aluminum pillared interlayered montmorillonite, the preferable one is aluminum pillared interlayered rectorite. The structural characteristics of the rectorite and the preparations of aluminum pillared interlayered rectorite and aluminum pillared interlayered rectorite containing catalysts can be referred to prior art, for example, U.S. Pat. No. 4,757,040.

Another active components used in the present invention is phosphorus and aluminum or magnesium or calcium modified high silica zeolite having a structure of pentasil, which is a 2~8 wt % phosphorus and 0.3~3.0 wt % aluminum or magnesium or calcium (based on zeolite weight, calculated as oxides) contained high silica zeolite having the structure of ZSM-5, ZSM-8 or ZSM-11 with a optimum Si/Al mole ratio of 15~60. The above said high silica zeolite having a structure of pentasil can be prepared by various known technologies disclosed in prior art, however, a preferable preparing method is as follows: using water glass, aluminum phosphate and inorganic acid as raw materials, and Y zeolite as crystalline seeds, crystallizing at 130~220° C. for 12~60 hours. The detailed preparation procedure of the method can be referred as to U.S. Pat. No. 5,232,675, the only difference is the present crystalline seed uses Y zeolite without rare earth. The phosphorus and aluminum or magnesium or calcium in the modified high silica zeolite having a structure of pentasil can be introduced by mixing the pre-prepared or purchased high silica zeolite having a structure of pentasil homogeneously with aluminum phosphate sol or magnesium phosphate sol or calcium phosphate sol according to a selected proportion, and followed by calcining at 400~60° C. for 3~6 hours in the presence of 60~100% steam; it can also be introduced by mixing pre-prepared or purchased high silica zeolite having a structure of pentasil homogeneously with phosphorus and aluminum or magnesium or calcium containing aqueous solution, and followed by impregnating for 0.5~4 hours, drying, and then calcining at 450~650° C. for 1~4 hours. The above said modified high silica zeolite having a structure of pentasil can also contain 0.3~3 wt % nickel based on zeolite weight, calculated as oxides). The nickel in the modified high silica zeolite having a structure of pentasil is introduced by mixing nickel containing compound homogeneously with pre-prepared or purchased high silica zeolite having a structure of pentasil and phosphorus and aluminum or magnesium or calcium containing aqueous solution, and followed by impregnating for 0.5~4 hours, drying, and then calcining at 450~650° C. for 1~4 hours.

The suitable heavy hydrocarbon feedstocks used in the present invention can be atmospheric gas oil or vacuum gas oil or the mixture thereof, residual oil or crude oil can be also directly processed. The pattern of feed injection into reactor can be single point injection or multi-point injection The advantages of the present invention in comparison with the prior art are as follows:

1. In a comparison with conventional catalytic cracking process, the process provided by the present invention uses pillared interlayered clay molecular sieve and/or phosphorus and aluminum or magnesium or calcium modified high silica zeolite having a structure of pentasil containing catalysts with lower hydrogen transfer activity and higher ethylene selectivity, and capability of increasing the reaction temperature, thus increases the yields of light olefins, especially ethylene and propylene.
2. In comparison with prior catalytic conversion processes for producing light olefins, the process provided by the present invention uses dilute phase transfer line reactor and pillared interlayered clay molecular sieve and/or phosphorus and aluminum or magnesium or calcium modified high silica zeolite having a structure of pentasil containing catalysts with higher cracking activity and higher olefin selectivity, thus increases the yields of light olefins, especially ethylene and propylene.
3. The process of the present invention provides the suitable catalysts, reactor type and operating conditions, thus obtains higher yields of light olefins especially ethylene, wherein the yields of ethylene and propylene can be more than 18 wt % respectively.
4. The feedstocks used in the process of the present invention possess wide boiling ranges, which can be atmospheric gas oil or vacuum gas oil or the mixture thereof, and can also be residual oil or crude oil.

The following examples will serve to fisher illustrate the catalytic pyrolysis process provided by the present invention. However, these examples shall not be construed to limit the scope of the present invention.

The catalysts used in these examples of the present invention are as follows:

Catalyst A is prepared according to the method disclosed in U.S. Pat. No. 4,757,040. It comprises 50 wt % pillared interlayered rectorite, 15 wt % phosphorus and magnesium containing high silica zeolite having a structure of pentasil and 30 wt % alumina, with the remainder being kaolin.

Catalyst B is prepared according to the method of conventional FCC catalyst. It comprises of 15 wt % phosphorus and calcium containing high silica zeolite having a structure of pentasil and 57 wt % amorphous aluminosilicate, with the remainder being kaolin.

Catalyst C is prepared according to the method of conventional FCC catalyst. It comprises of 15 wt % phosphorus and magnesium containing high silica zeolite having a structure of pentasil and 57 wt % amorphous aluminosilicate, with the remainder being kaolin.

Catalyst D is prepared according to the method of conventional FCC catalyst. It comprises 15 wt % phosphorus and aluminum containing high silica zeolite having a structure of pentasil and 57 wt % amorphous aluminosilicate, with the remainder being kaolin.

Catalyst E is prepared according to the method of conventional FCC catalyst. It comprises 20 wt % phosphorus and magnesium containing high silica zeolite having a structure of pentasil, 3.5 wt % REY zeolite and 25 wt % alumina, with the remainder being kaolin.

Catalyst F is prepared according to the method of conventional FCC catalyst. It comprises 20 wt % phosphorus, magnesium and nickel containing high silica zeolite having a structure of pentasil and 25 wt % alumina, with the remainder being kaolin.

The high silica zeolite having a structure of pentasil used in the catalysts A, B, C, D, E and F is a ZSM-5 zeolite having a Si/Al mole ratio of 25 made by the Catalyst Factory of Changling Petrochemical Company in Hunan, China.

The main physico-chemical properties of the Catalysts A, B, C, D, E and F are listed in Table 1.

The main properties of the feedstocks used in these examples are listed in Table 2.

VGO as feedstock with Catalyst C and operated in a single pass operation mode. The feedstock was preheated to about 350° C. and injected into the inlet of riser reactor, high temperature steam was injected to the outlet of preheater and the inlet of riser reactor, the weight ratio of steam to feedstock is 0.8:1. The feedstock was contacted with hot catalyst in a riser reactor and catalytically pyrolysed at a riser outlet temperature of 685° C. and a pressure of 0.25 MPa for a contact time of 2.5 seconds and with a weight ratio of catalyst to feedstock of 25:1. The reaction effluent, steam and the spent catalyst were separated by rapid gas-solid separation system in the outlet of riser reactor, reaction effluent was quenched by hydrocarbon and further separated to obtain gaseous and liquid products:, and spent catalyst was further removed to the stripper. After being stripped by steam, the spent catalyst was removed to a regenerator where it was contacted with heated air and regenerated, the regenerated catalyst was stripped by steam to desorb the carried non-hydrocarbon impurities and then recycled to the reactor for reuse. The results of the test are listed in Table 3.

TABLE 1

| Catalyst | A | B | C | D | E | F |
|---|---|---|---|---|---|---|
| Chemical Composition, wt % | | | | | | |
| $Al_2O_3$ | 50.5 | 40.5 | 40.0 | 41.5 | 46.5 | 45.4 |
| $Na_2O$ | 1.03 | 0.05 | 0.05 | 0.05 | 0.05 | 0.05 |
| Physical Properties | | | | | | |
| SA, $m^2/g$ | 200 | 118 | 113 | 120 | 128 | 123 |
| PV, ml/g | 0.16 | 0.12 | 0.11 | 0.13 | 0.12 | 0.12 |
| ABD, g/ml | 0.89 | 0.86 | 0.86 | 0.86 | 0.81 | 0.82 |
| A.I., wt %/h | 3.0 | 1.0 | 1.0 | 1.0 | 2.4 | 1.6 |
| Particle Size Distribution, wt % | | | | | | |
| 0–40 micron | — | 26.5 | 27.2 | 28.2 | 16.6 | 18.8 |
| 40–80 micron | — | 59.8 | 58.6 | 58.1 | 42.0 | 58.6 |
| >80 micron | — | 13.7 | 14.2 | 13.7 | 41.4 | 22.6 |

TABLE 2

| Feedstock | AGO | VGO | ATB | Crude oil |
|---|---|---|---|---|
| Density(20° C.), g/ml | 0.8184 | 0.8730 | 0.8953 | 0.8576 |
| CCR, wt % | 0.01 | 0.15 | 4.17 | 3.75 |
| Hydrogen, wt % | 14.00 | 13.54 | 12.94 | — |
| Nickel, ppm | — | 0.09 | 4.78 | 3.36 |
| Vanadium, ppm | — | <0.01 | 0.08 | <0.05 |
| Distillation, ° C. | | | | |
| IBP | 242 | 346 | 299 | — |
| 10% | 264 | 411 | 389 | — |
| 30% | 278 | 437 | 480 | — |
| 50% | 290 | 462 | — | — |
| 70% | 304 | 489 | — | — |
| 90% | 323 | 523 | — | — |
| EP | 347 | 546 | — | — |

EXAMPLE 1

This example illustrates the process provided by the present invention for production of ethylene and propylene by catalytic pyrolysis of heavy hydrocarbons in transfer line reactor.

The test was carried out in a riser pilot plant with continuous reaction and regeneration operation system using

TABLE 3

| Feedstock | VGO |
|---|---|
| Catalyst | C |
| Operating Conditions | |
| Riser outlet temperature, ° C. | 685 |
| Contact time, sec. | 2.5 |
| Catalyst/oil ratio | 25:1 |
| Steam/oil ratio | 0.8:1 |
| Product Yields, wt % | |
| Cracked gas | 66.67 |
| in which, ethylene | 22.02 |
| Propylene | 20.81 |
| Butylenes | 9.51 |
| $C_5$+ naphtha | 15.65 |
| LCO | 6.44 |
| HCO | 3.56 |
| Coke | 7.68 |
| Light Olefins Yield, wt % | 52.34 |

EXAMPLE 2

This example illustrates the process provided by the present invention for production of ethylene and propylene by using various catalysts selected from the present invention.

The tests were carried out in a bench scale fixed-fluidized bed reactor at a temperature of 680° C., with a weight ratio of catalyst to feedstock of 15:1, a weight ratio of steam to feedstock of 0.8:1 and a weight hourly space velocity of $10h^-$. The results of the tests are listed in Table 4.

From the data of Table 4, it can be seen that catalysts A, B, C, D, E and F all exhibit high ethylene and propylene yields.

TABLE 4

| Catalyst | A | B | C | D | E | F |
|---|---|---|---|---|---|---|
| Product Yields, wt % | | | | | | |
| Cracked gas | 67.26 | 68.61 | 69.70 | 69.32 | 73.97 | 70.48 |
| in which, ethylene | 19.50 | 19.81 | 20.77 | 20.41 | 22.75 | 22.26 |
| propylene | 21.58 | 22.72 | 22.47 | 22.52 | 25.13 | 22.66 |
| butylenes | 11.37 | 10.53 | 10.69 | 10.61 | 10.86 | 10.37 |
| $C_5$+ naphtha | 15.02 | 17.84 | 15.22 | 15.05 | 11.25 | 14.36 |
| LCO | 5.74 | 3.73 | 5.33 | 5.16 | 3.12 | 3.48 |
| HCO | 4.58 | 2.64 | 3.65 | 4.10 | 3.03 | 3.40 |
| Coke | 7.40 | 7.18 | 6.10 | 6.37 | 8.63 | 8.28 |
| Light Olefins Yield, wt % | 52.45 | 53.06 | 53.93 | 53.54 | 58.74 | 55.29 |

EXAMPLE 3

This example illustrates that heavy hydrocarbons with different boiling ranges can be used as feedstocks in the process provided by the present invention.

The tests were carried out in a bench scale fixed bed reactor using different catalysts. The operating condition and the results of the tests are listed in Table 5.

EXAMPLE 4

This example illustrates that the full range crude oil can be used as feedstock in the process provided by the present invention.

The test was carried out in a bench scale fixed bed reactor using Catalyst A. The operating conditions and the results of the tests are listed in Table 6.

TABLE 5

| Feedstock | AGO | VGO | ATB |
|---|---|---|---|
| Catalyst | B | C | A |
| Operating Conditions | | | |
| Reaction temperature, ° C. | 750 | 700 | 650 |
| Contact time, sec | 2 | 3 | 5 |
| Catalyst/oil ratio | 15:1 | 15:1 | 25:1 |
| Steam/oil ratio | 0.3:1 | 0.8:1 | 1:1 |
| Product Yields, wt % | | | |
| Cracked gas | 70.85 | 75.03 | 62.38 |
| in which, ethylene | 18.98 | 21.09 | 18.07 |
| propylene | 18.69 | 23.56 | 19.25 |
| butylenes | 10.23 | 10.47 | 9.86 |
| $C_5$+ liquid | 21.08 | 17.83 | 28.10 |
| Coke | 8.07 | 7.14 | 9.52 |
| Light Olefins Yield, wt % | 47.90 | 55.12 | 47.48 |

TABLE 6

| Feedstock | Crude oil |
|---|---|
| Catalyst | A |
| Operating Conditions | |
| Reaction temperature, ° C. | 700 |
| Contact time, sec | 0.2 |
| Catalyst/oil ratio | 40:1 |
| Steam/oil ratio | 0.5:1 |
| Product Yields, wt % | |
| Cracked gas | 61.92 |
| in which, ethylene | 19.35 |
| Propylene | 18.02 |
| Butylenes | 10.89 |
| $C_5$+ liquid | 31.02 |
| Coke | 7.06 |
| Light Olefins Yield, wt % | 48.26 |

What is claimed is:

1. A process for producing ethylene and propylene, which comprises:

contacting heavy hydrocarbon feedstock with a hot catalyst in a reactor in the presence of steam, wherein the catalyst comprises pillared interlayered clay molecular sieve and/or phosphorous and aluminum or magnesium or calcium modified high silica zeolite having pentasil structure, and the contacting is performed at a temperature of 650–750° C, a pressure of 0.15–0.4 MPa, a contact time of 0.2–0.5 seconds; a weight ratio of catalyst to feedstock of 15:1 to 40:1 and a ratio of steam to feedstock of 0.3:1 to 1:1.

2. The process according to claim 1, wherein said catalyst can also contain Y molecular sieve.

3. The process according to claim 1, wherein said pillared interlayered clay molecular sieve is pillared interlayered rectorite.

4. The process according to claim 1, wherein said phosphorus and aluminum or magnesium or calcium modified high silica zeolite having a structure of pentasil is a 2~8 wt % phosphorus and 0.3~3.0 wt % aluminum or magnesium or calcium (based on zeolite weight, calculated as oxides) containing high silica zeolite having a structure of pentasil with a Si/Al mole ratio of 15~60.

5. The process according to claim 4, wherein said modified high silica zeolite having a structure of pentasil can also contain 0.3~3.0 wt % nickel (based on zeolite weight, calculated as oxides).

6. The process according to claim 4, wherein said modified high silica zeolite having a structure of pentasil is prepared by mixing high silica zeolite having a structure of pentasil homogeneously with aluminum phosphate sol or magnesium phosphate sol or calcium phosphate sol and followed by calcining at 400~600° C. for 3~6 hours in the presence of 60~100% steam.

7. The process according to claim 4, wherein said modified high silica zeolite having a structure of pentasil is prepared by mixing high silica zeolite having a structure of pentasil homogeneously with phosphorus and aluminum or magnesium or calcium containing aqueous solution, and followed by impregnating for 0.5~4 hours, drying, calcining at 450~650° C. for 1~4 hours.

8. The process according to claim 5, wherein said nickel in the modified high silica zeolite having a structure of pentasil is introduced by mixing nickel compound homogeneously with high silica zeolite having a structure of pentasil and phosphorus and aluminum or magnesium or calcium containing aqueous solution, and followed by impregnating for 0.5~4 hours, drying, calcining at 450~650° C. for 1~4 hours.

9. The process according to claim 4, wherein said high silica zeolite having a structure of pentasil is one selected from the group of high silica zeolites having a structure of ZSM-5, ZSM-8 or ZSM-11 type.

10. The process according to claim 4, wherein said high silica zeolite having a structure of pentasil is prepared by using water glass, aluminum phosphate and inorganic acid as raw materials, and Y zeolite as crystalline seeds, and crystallizing at 130~200° C. for 12~60 hours.

11. The process according to claim 1, wherein said reaction effluent is quenched by injecting light hydrocarbons into the riser outlet as fast coolant.

12. The process according to claim 1, wherein said heavy hydrocarbon feedstocks are atmospheric gas oil or Sum gas oil or the mixture thereof as well as residual oil or crude oil.

13. The process according to claim 1, which further comprises:

separating reaction effluent by a gas-solid separation system in the outlet of a riser or downflow transfer line reactor;

quenching and separating the reaction effluent to obtain ethylene and propylene containing gaseous products and liquid products;

stripping spent catalyst by steam;

regenerating the steam stripped spent catalyst by contacting the spent catalyst with oxygen and burning off coke; and stripping the spent catalyst for reuse.

14. The process according to claim 1, wherein the high-silica zeolite having a structure of pentasil is without rare earth.

\* \* \* \* \*

UNITED STATES PATENT AND TRADEMARK OFFICE
CERTIFICATE OF CORRECTION

PATENT NO.   : 6,210,562 B1
DATED        : April 3, 2001
INVENTOR(S)  : Xie et al.

It is certified that error appears in the above-identified patent and that said Letters Patent is hereby corrected as shown below:

Column 8,
Lines 29-40, claim 1 should read as follows:

-- A process for producing ethylene and propylene, which comprises:

Contacting heavy hydrocarbon feedstock with a hot catalyst in a reactor in the presence of steam, wherein the catalyst comprises pillared interlayered clay molecular sieve and/ or phosphorous and aluminum or magnesium or calcium modified high silica zeolite having pentasil sturcture, and the contacting is performed at a temperature of 650-750º C, a pressure of 0.15-0.4 MPa, a contact time of 0.2-0.5 seconds; a weight ratio of catalyst to feedstock of 15:1 to 40:1 and a ratio of steam to feedstock of 0.3:1 to 1:1. --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,210,562 B1
DATED : April 3, 2001
INVENTOR(S) : Xie et al.

It is certified that error appears in the above-identified patent and that said Letters Patent is hereby corrected as shown below:

<u>Column 8,</u>
Line 29, should read as follows:

-- A process for producing ethylene and propylene, which comprises:

contacting heavy hydrocarbon feedstock with a hot catalyst in a reactor in the presence of steam, wherein the catalyst comprises pillared interlayered clay molecular sieve and/or phosphorous and aluminum or magnesium or calcium modified high silica zeolite having pentasil structure, and the contacting is performed at a temperature of 650-750°C, a pressure of 0.15-0.4 MPa, a contact time of 0.2-5 seconds; a weight ratio of catalyst to feedstock of 15:1 to 40:1 and a ratio of steam to feedstock of 0.3:1 to 1:1. --

Signed and Sealed this

Eighteenth Day of November, 2003

JAMES E. ROGAN
*Director of the United States Patent and Trademark Office*